(12) United States Patent
Renken

(10) Patent No.: US 7,230,351 B2
(45) Date of Patent: Jun. 12, 2007

(54) CIRCUIT ARRANGEMENT FOR STABILIZING A SUPPLY VOLTAGE AND METHOD FOR OPERATING SAID CIRCUIT ARRANGEMENT

(75) Inventor: Folker Renken, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 338 days.

(21) Appl. No.: 11/031,838

(22) Filed: Jan. 6, 2005

(65) Prior Publication Data
US 2005/0134236 A1 Jun. 23, 2005

Related U.S. Application Data

(63) Continuation of application No. PCT/DE03/02209, filed on Jul. 2, 2003.

(30) Foreign Application Priority Data
Jul. 17, 2002 (DE) ............................... 102 32 416

(51) Int. Cl.
*H02J 1/10* (2006.01)

(52) U.S. Cl. ......................................................... 307/44
(58) Field of Classification Search .................. 307/44
See application file for complete search history.

(56) References Cited

U.S. PATENT DOCUMENTS
4,816,736 A * 3/1989 Dougherty et al. .......... 320/116

FOREIGN PATENT DOCUMENTS
DE 198 05 545 A1 8/1999
EP 1 130 737 A1 3/2001
FR 2 757 806 A1 12/1996

* cited by examiner

Primary Examiner—Robert L. DeBeradinis
(74) Attorney, Agent, or Firm—Baker Botts L.L.P.

(57) ABSTRACT

A voltage source is formed by a series connection of a first energy accumulator (accumulator B1) and a second energy accumulator (capacitor C1). The voltage (UC1) of the second energy accumulator (C1) is adjusted in such a way that the sum of the voltages via the first energy accumulator (UB1) and the second energy accumulator (UC1) are the same as that of a pre-determined desired voltage (UVsoll).

12 Claims, 3 Drawing Sheets

CIRCUIT ARRANGEMENT FOR STABILIZING A SUPPLY VOLTAGE AND METHOD FOR OPERATING SAID CIRCUIT ARRANGEMENT

CROSS REFERENCE TO RELATED APPLICATION

This application is a continuation of copending International Application No. PCT/DE03/02209 filed Jul. 2, 2003 which designates the United States, and claims priority to German application no. 102 32 416.6 filed Jul. 17, 2002.

TECHNICAL FIELD OF THE INVENTION

The present invention relates to a circuit arrangement for stabilizing a supply voltage, in particular a supply voltage of a motor vehicle, and a method for operating said circuit arrangement.

DESCRIPTION OF THE RELATED ART

The supply voltage of a consumer supplied by an energy storage unit depends on the one hand on the load applied by the consumer to the energy storage unit and also the charge status of the energy storage unit.

Consumers supplied by the energy storage unit can therefore experience significant voltage fluctuations. Consumers supplied in this manner must therefore be largely insensitive to voltage fluctuations, thereby imposing stringent requirements on the consumers.

One option known within the company for stabilizing supply voltage is to regulate the supply voltage via a step-up converter, thereby keeping it at a constant value. Such a circuit arrangement is however very expensive and cost-intensive, as the switching elements of the step-up converter are subject to loading from the entire current supplied to the consumer.

SUMMARY OF THE INVENTION

The object of the invention is to create a circuit arrangement for stabilizing a supply voltage and a method for operating said circuit arrangement, which provide a stabilized supply voltage for at least one consumer in a simple manner.

This object can be achieved by a circuit arrangement for stabilizing a supply voltage, comprising a first accumulator, a first energy storage unit, which is connected in series to the first accumulator, a voltage transformer, a first terminal side of which is connected electrically to the first energy storage unit and regulates the voltage of the first energy storage unit, a second accumulator, which is connected electrically to a second terminal side of the voltage transformer, wherein the first energy storage unit is supplied with energy from the second accumulator via the voltage transformer, and a control unit, which controls the voltage transformer and regulates the voltage of the first energy storage unit such that the sum of the voltages across the first accumulator and the first energy storage unit is equal to a predetermined target voltage.

The nominal voltages of the first and second accumulators can be of different orders. The circuit arrangement may comprise a second voltage transformer, one terminal side of which is connected electrically to the first accumulator and the other terminal side of which is connected electrically to the second accumulator, thus allowing an exchange of energy between the first and second accumulators. The circuit arrangement may comprise a third voltage transformer, one terminal side of which is connected electrically to a third accumulator and the other terminal side of which is connected electrically to the first accumulator, thus allowing an exchange of energy between the first and third accumulators.

The object can also be achieved by a method for operating a circuit arrangement comprising a first accumulator, a first energy storage unit, which is connected in series to the first accumulator, a voltage transformer, a first terminal side of which is connected electrically to the first energy storage unit, a second accumulator, which is connected electrically to a second terminal side of the voltage transformer, wherein the first energy storage unit is supplied with energy from the second accumulator via the voltage transformer, and a control unit, the method comprising the step of regulating the voltage of the first energy storage unit as a function of the voltage of the first accumulator such that the sum of the voltages across the first accumulator and the second energy storage unit is equal to a predetermined target voltage.

The voltages of the first and second accumulators can be regulated via a second voltage transformer such that the voltages at the first and second accumulators are of the same order. The voltages of the first and second accumulators can be regulated via a second voltage transformer such that the voltages at the first and second accumulators are in a predefined ratio to each other. The voltage of a third accumulator can be regulated via a third voltage transformer such that the voltages at the first, second and third accumulators are in a predefined ratio to each other.

The circuit arrangement thereby has a first and a second energy storage unit, the voltage via the second energy storage unit being regulated such that the sum of the voltages via the first and second energy storage units is equal to a predefined target voltage.

The sum of the voltages via the first and second energy storage units can therefore be kept constant irrespective of the load.

The voltage via the second energy storage unit is regulated via an electrical converter supplied by a third energy storage unit such that the sum of the voltages via the first and second energy storage units is equal to a predefined target value.

This circuit arrangement has the advantage that the requirements imposed on the switching elements of the electrical converter are significantly less stringent than for a converter that converts the voltage of an energy storage unit to a predefined voltage value and therefore has to transfer all the energy required by the system.

BRIEF DESCRIPTION OF THE DRAWINGS

A plurality of exemplary embodiments is described below with reference to the schematic drawings, in which.

DETAILED DESCRIPTION OF THE PREFERRED EMBODIMENTS

Figure 1:
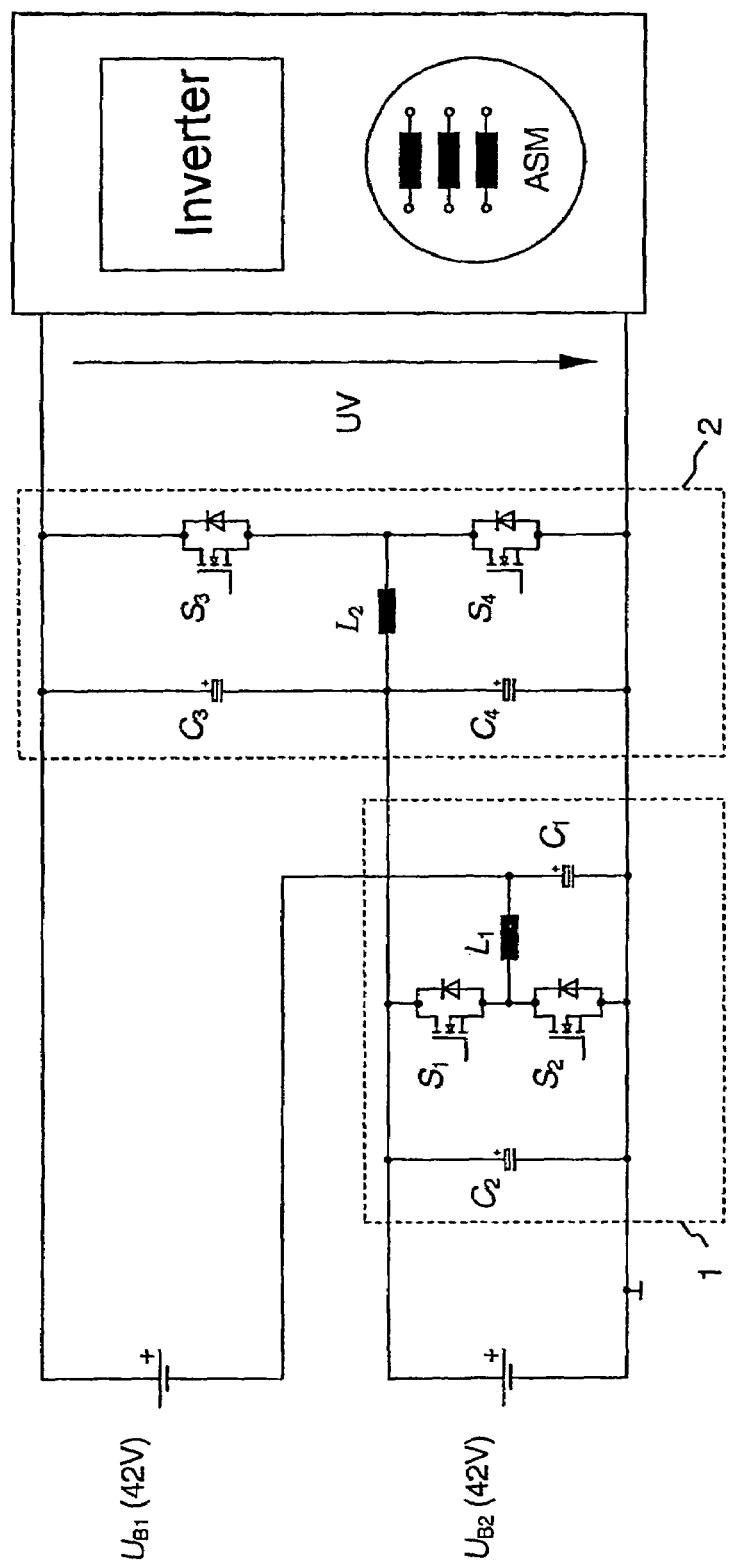
FIG. 1 shows a first exemplary embodiment of an inventive circuit arrangement with two 42 V accumulators.

The circuit arrangement shown in FIG. 1 has a first 42 V accumulator B1, a second accumulator B2, an energy storage unit C1 and a first converter 1 and a second converter 2. The converters 1 and 2 are in the form of DC/DC converters here.

The energy storage unit C1 is connected in series to the first accumulator. The energy storage unit C1 here is an electrolytic capacitor.

The energy storage unit C1 has a positive and a negative terminal. The negative terminal of the energy storage unit C1 is connected electrically to earth.

The supply voltage UV, supplied by the circuit arrangement, can be tapped between the positive terminal of the accumulator B1 and the negative terminal of the energy storage unit C1.

The second 42 V accumulator B2 is connected electrically via the first converter 1 to the energy storage unit C1 and supplies energy to the energy storage unit C1.

The converter 1 has a second energy storage unit C2, which is arranged parallel to the second accumulator B2. A series circuit of a first and a second switching element S1 and S2 is also arranged parallel to the accumulator B2. The switching elements S1 and S2 each have a first and a second terminal and a control input.

The first terminal of the first switching element S1 is connected to the positive pole of the accumulator B2 and the positive terminal of the energy storage unit C1. The second terminal of the switching element S1 is connected electrically to both the first terminal of the switching element S2 and a coil L1. The coil L1 is connected electrically on the one hand to the positive terminal of the energy storage unit C1 and also to earth.

The control inputs of the switching elements S1 and S2 are connected to a control circuit (not shown) and are activated by this.

The voltage UC1 via the energy storage unit C1 is regulated via the converter 1 such that the sum of the voltages UB1 and UC1 is equal to a predetermined supply voltage UVtarg.

If the voltage $U_{B1}$ now drops due to a load applied by an external consumer, the voltage via the energy storage unit C1 is increased, until the voltage UVtarg is once more achieved.

If the first switching element S1 is always switched on, the two accumulators B1 and B2 are connected in series.

A second converter 2 regulates the voltage $U_{B2}$ at the accumulator B2 such that the voltages via the two accumulators B1 and B1 have the same value.

The converter 2 has a third and a fourth energy storage unit C3 and C4 as well as a third and a fourth switching element S3 and S4 and a second coil L2.

The control inputs of the switching elements S3 and S4 are connected to a control circuit (not shown) here too and are activated by this.

The energy storage units C3 and C4 connected in series are arranged between the positive pole of the accumulator B1 and earth, the first terminal of the energy storage unit C3 being connected electrically to the positive pole of the accumulator B1 and the second terminal of the energy storage unit C3 being connected electrically to the first terminal of the energy storage unit C4. The second terminal of the energy storage unit C4 is connected to earth. The series circuit of the switching elements S3 and S4 is arranged parallel to the energy storage units C3 and C4.

These are also arranged between the positive pole of the accumulator B1 and earth. A further coil L2 is arranged between the center taps of the energy storage units C3 and C4 and the switching elements S3 and S4. The second terminal of the energy storage unit C3 is connected electrically to the positive pole of the accumulator B2.

A generator ASM is connected, in the exemplary embodiment shown here via an inverter, between the positive pole of the accumulator B1 and earth, between which the supply voltage $U_V$ drops.

The generator ASM is driven by a drive unit (not shown), thereby generates energy and supplies the two accumulators B1 and B2 with energy.

The inventive circuit arrangement can however also be connected via an inverter to a starter generator, thereby taking up energy from the starter generator and also supplying the starter generator with energy in motor operation.

Figure 2:
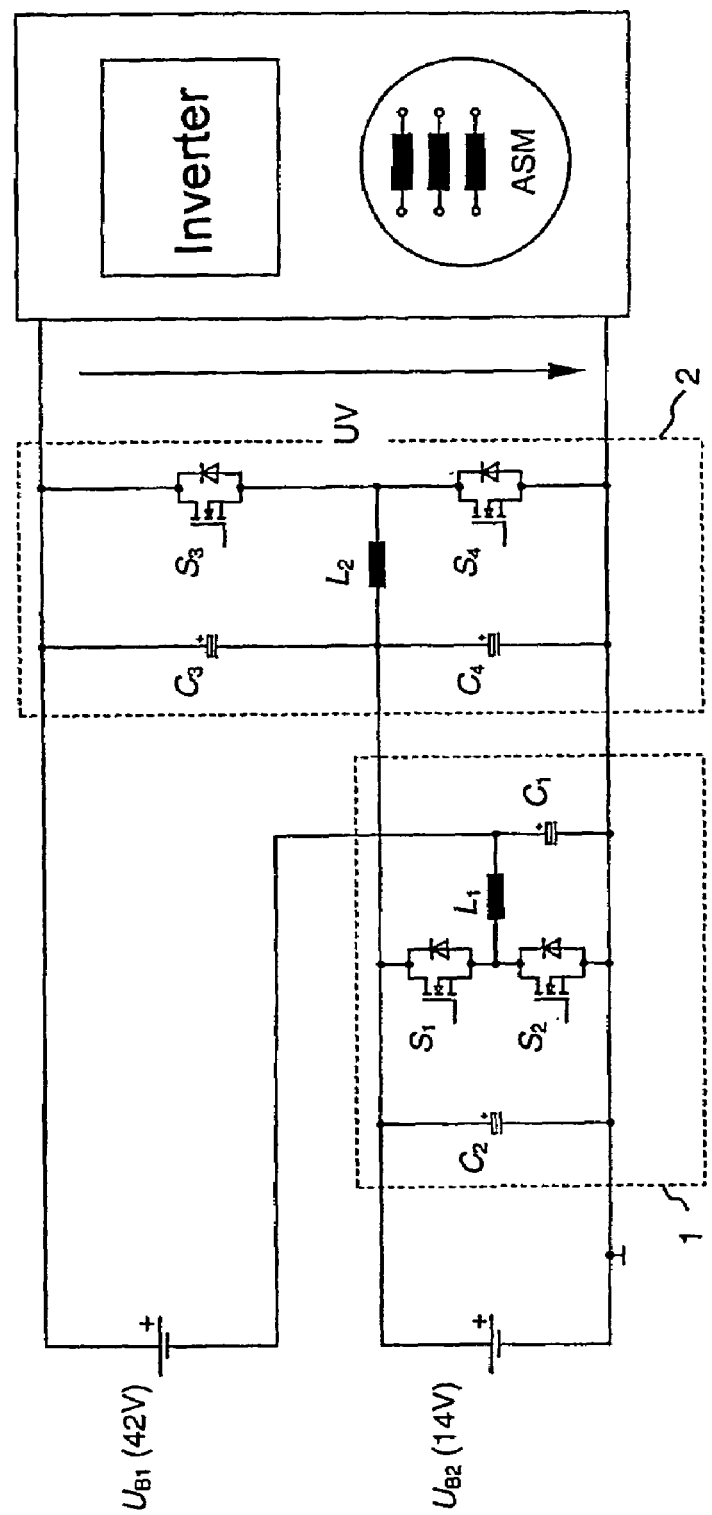
FIG. 2 shows a second exemplary embodiment of an inventive circuit arrangement with a 14 V and 42 V accumulator respectively.

The second exemplary embodiment shown in FIG. 2 differs from the exemplary embodiment shown in FIG. 1 in that the two accumulators B1 and B2 have different nominal voltages UB1 and UB2.

In the exemplary embodiment according to FIG. 2 functionally identical elements to those in the first exemplary embodiment have the same reference characters as in FIG. 1.

This exemplary embodiment is for example suitable for the voltage supply of a circuit arrangement with two different supply voltages. In the exemplary embodiment shown here the first accumulator voltage $U_{B1}$ is equal to 42 volts and the second accumulator voltage $U_{B2}$ is equal to 14 volts.

The accumulator voltage $U_{B2}$ is always regulated to ⅓ of the accumulator voltage $U_{B1}$ via the second converter 2.

Compared with the exemplary embodiment shown in FIG. 1, in the second exemplary embodiment the supply voltage UV can only be regulated at constant within a smaller load range, as the accumulator voltage UB2 is lower and therefore the voltage at the energy storage unit C1 can at a maximum be the voltage UB2. If for example the first switching element S1 is always switched on, i.e. the supply voltage is equal to the sum of the two accumulator voltages UB1 and UB2, the supply voltage drops with each additional load.

Figure 3:
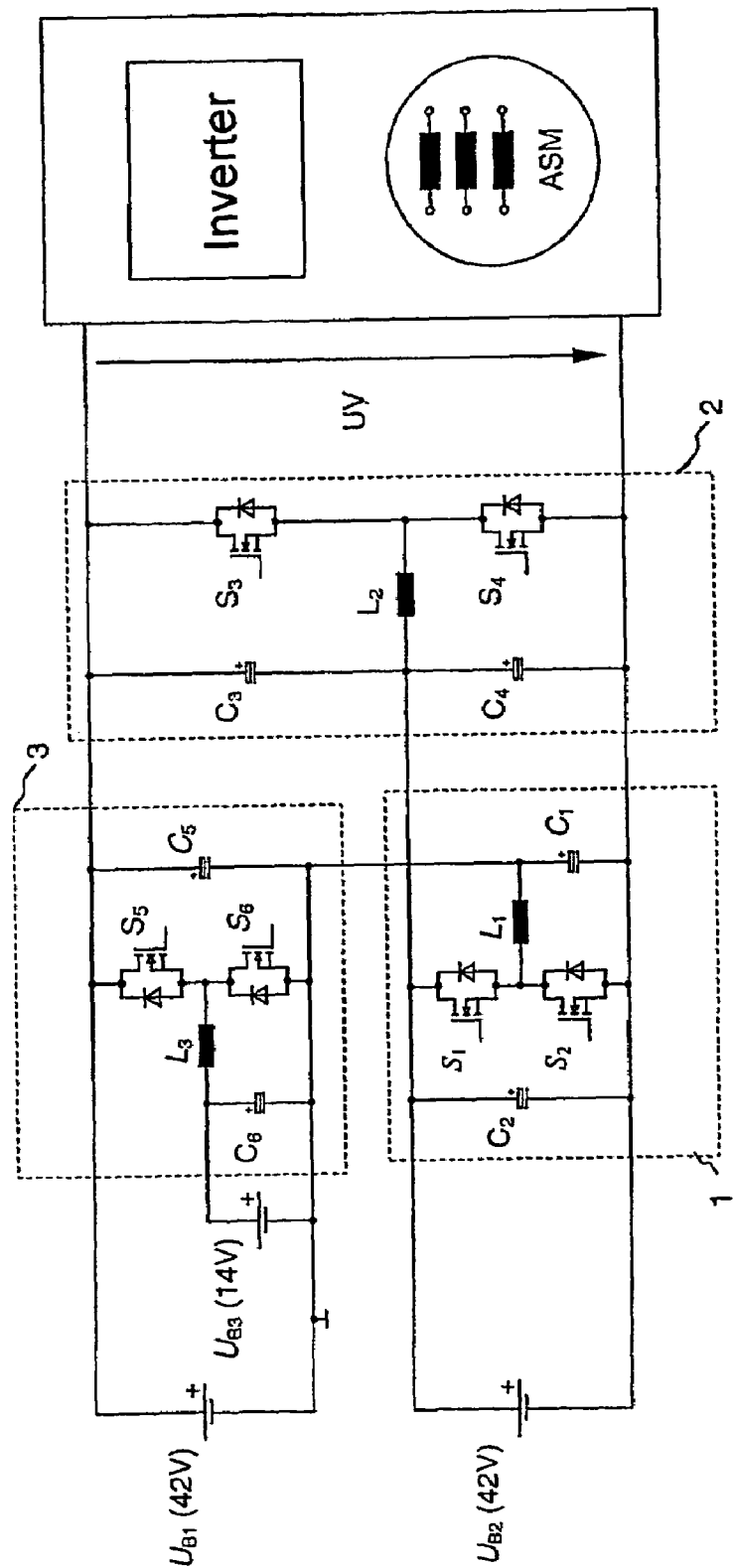
FIG. 3 shows a third exemplary embodiment of an inventive circuit arrangement with a 14 V and two 42 V accumulators.

In the case of the third exemplary embodiment shown in FIG. 3, functionally identical elements have the same reference characters as in FIG. 1.

A further energy storage unit C5 is arranged parallel to the first accumulator B1 here. The supply voltage UV here is equal to the sum of the voltages UC1 and UC5 via the energy storage units C1 and C5.

A third accumulator B3, here with a nominal voltage of 14 V, has a negative and a positive terminal.

The negative terminal of the third accumulator B3 is connected electrically to the negative terminal of the first accumulator B1 and to earth.

The voltage $U_{B3}$ at the third accumulator B3 is regulated via a third electrical converter 3 such that it corresponds to the nominal voltage of the accumulator B3. The third converter has two switching elements S5 and S6 connected in series, which are arranged parallel to the energy storage unit C5 and the accumulator B1. The common terminal of the switching elements S5 and S6 is connected electrically to a first terminal of a coil L3. A second terminal of the coil L3 is connected electrically to a positive terminal of a further energy storage unit C6 and the positive terminal of the accumulator B3.

The advantage of the third exemplary embodiment compared with the second exemplary embodiment from FIG. 2 is that both the first accumulator B1 and the third accumulator B3 have a link to earth.

The energy storage units C2, C3, C4 and C6 and the coils L1, L2 and L3 have the task of smoothing the voltages converted by the converters 1, 2 and 3.

I claim:

1. A circuit arrangement for stabilizing a supply voltage, comprising:
    a first accumulator,
    a first energy storage unit, which is connected in series to the first accumulator,
    a voltage transformer, a first terminal side of which is connected electrically to the first energy storage unit and regulates the voltage of the first energy storage unit,
    a second accumulator, which is connected electrically to a second terminal side of the voltage transformer, wherein the first energy storage unit is supplied with energy from the second accumulator via the voltage transformer, and
    a control unit, which controls the voltage transformer and regulates the voltage of the first energy storage unit such that the sum of the voltages across the first accumulator and the first energy storage unit is equal to a predetermined target voltage.

2. The circuit arrangement according to claim 1, wherein the nominal voltages of the first and second accumulators are of different orders.

3. The circuit arrangement according to claim 1, wherein the circuit arrangement comprises a second voltage transformer, one terminal side of which is connected electrically to the first accumulator and the other terminal side of which is connected electrically to the second accumulator, thus allowing an exchange of energy between the first and second accumulators.

4. The circuit arrangement according to claim 1, wherein the circuit arrangement comprises a third voltage transformer, one terminal side of which is connected electrically to a third accumulator and the other terminal side of which is connected electrically to the first accumulator, thus allowing an exchange of energy between the first and third accumulators.

5. A method for operating a circuit arrangement comprising a first accumulator,
    a first energy storage unit, which is connected in series to the first accumulator, a voltage transformer, a first terminal side of which is connected electrically to the first energy storage unit, a second accumulator, which is connected electrically to a second terminal side of the voltage transformer, wherein the first energy storage unit is supplied with energy from the second accumulator via the voltage transformer, and a control unit, the method comprising the step of:
    regulating the voltage of the first energy storage unit as a function of the voltage of the first accumulator such that the sum of the voltages across the first accumulator and the second energy storage unit is equal to a predetermined target voltage.

6. The method according to claim 5, wherein the voltages of the first and second accumulators are regulated via a second voltage transformer such that the voltages at the first and second accumulators are of the same order.

7. The method according to claim 5, wherein the voltages of the first and second accumulators are regulated via a second voltage transformer such that the voltages at the first and second accumulators are in a predefined ratio to each other.

8. The method according to claim 5, wherein the voltage of a third accumulator is regulated via a third voltage transformer such that the voltages at the first, second and third accumulators are in a predefined ratio to each other.

9. A circuit arrangement for stabilizing a supply voltage, comprising:
    a first accumulator,
    a first energy storage unit, which is connected in series to the first accumulator,
    a voltage transformer having an output side electrically connected to the first energy storage unit,
    a second accumulator electrically connected to an input side of the voltage transformer, and
    a control unit, which controls the voltage transformer and regulates the voltage of the first energy storage unit such that the sum of the voltages across the first accumulator and the first energy storage unit is equal to a predetermined target voltage.

10. The circuit arrangement according to claim 9, wherein the nominal voltages of the first and second accumulators are of different orders.

11. The circuit arrangement according to claim 9, wherein the circuit arrangement comprises a second voltage transformer, one terminal side of which is connected electrically to the first accumulator and the other terminal side of which is connected electrically to the second accumulator, thus allowing an exchange of energy between the first and second accumulators.

12. The circuit arrangement according to claim 9, wherein the circuit arrangement comprises a third voltage transformer, one terminal side of which is connected electrically to a third accumulator and the other terminal side of which is connected electrically to the first accumulator, thus allowing an exchange of energy between the first and third accumulators.

* * * * *